(12) United States Patent
Butler et al.

(10) Patent No.: US 6,741,612 B1
(45) Date of Patent: May 25, 2004

(54) TWO-PORT ETHERNET LINE EXTENDER

(75) Inventors: Kent A. Butler, Cedar Valley, UT (US); Alma K. Schurig, Cedar Hills, UT (US)

(73) Assignee: Omninet Capital, LLC, Beverly Hills, CA (US)

(*) Notice: Subject to any disclaimer, the term of this patent is extended or adjusted under 35 U.S.C. 154(b) by 115 days.

(21) Appl. No.: 10/093,086

(22) Filed: Mar. 5, 2002

(51) Int. Cl.[7] .................................................. H04J 3/08
(52) U.S. Cl. ........................ 370/501; 370/293; 370/502; 370/463
(58) Field of Search ................................. 370/285, 293, 370/352–354, 386, 389, 392, 401, 402, 419, 437, 463, 465, 492, 501, 502; 375/211, 219, 220, 221

(56) References Cited

U.S. PATENT DOCUMENTS

| | | | |
|---|---|---|---|
| 5,875,210 A | * 2/1999 | Brief et al. ................. | 375/211 |
| 5,923,663 A | * 7/1999 | Bontemps et al. ........... | 370/445 |
| 6,272,552 B1 | 8/2001 | Melvin et al. ............... | 709/250 |
| 6,328,480 B1 | 12/2001 | Strike .......................... | 385/75 |
| 6,377,640 B2 | * 4/2002 | Trans .......................... | 375/354 |
| 6,430,695 B1 | * 8/2002 | Bray et al. .................. | 713/501 |
| 6,516,352 B1 | * 2/2003 | Booth et al. ................. | 370/463 |
| 6,556,589 B2 | * 4/2003 | McRobert et al. .......... | 370/501 |

* cited by examiner

Primary Examiner—Phirin Sam
(74) Attorney, Agent, or Firm—Townsend and Townsend and Crew LLP; Kenneth R. Allen

(57) ABSTRACT

An apparatus for deployment in an outdoor environment for extending the electrical communication distance of digital data signals includes electrical isolation means for various electromagnetic effects and a high speed pulse reshaper and repeater. The isolation means includes low capacitance electric pulse suppression means so that maximum signal distance can be achieved without loss of usable pulse shape and isolation transformers on differential signal pairs that retain magnetization at elevated temperatures so that signals are not blocked. As a further feature, extended logic is included whereby the type of signals can be distinguished, thus allowing the apparatus to be daisy-chained with like apparatus or used between a termination and a line.

5 Claims, 2 Drawing Sheets

TWO-PORT ETHERNET LINE EXTENDER

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to digital data communications over distance-limited wire media. In particular, this invention relates to an apparatus for extending the propagation distance of digital data signals.

There is a need to provide means to extend the effective distance over which digital data signals are communicated via wire in an outdoor environment. Distances may be greater than be supported by the conventional routers and switches. For example, known implementations of 100 BASE-TX physical layer integrated circuits such as the Broadcom AC104QF (from Broadcom, Inc.) typically handle only up to 150 m (492 ft.) of Category 5 cabling at room temperature for speeds up to 100 MBPS. Moreover, power consumption becomes a serious concern because power must be supplied and distributed by the outdoor network. Alternative schemes such as optical fiber are not cost effective for all applications, particularly over relatively short distances of several hundred meters.

A standard has been adopted for electrical and magnetic isolation of electronic circuitry intended to be operated in a severe outdoor environment. The standard is referenced as IEEE 802.3u, IEEE 802.3ab and ANSI X3.236. The specifications provide for operation in a temperature range between 0 and 70 Celsius. For extended operation between −40 C and +85 C, which is more typical of actual experience in some environments, adoption of this standard would be inadequate for reliable operation. Because Category 5 cabling and installation are less expensive than the fiber optic alternative, it is desirable to be able to go farther than the 100 m (328) feet required by the IEEE standard using a low cost cable extender that is powered from the upstream network cable.

SUMMARY OF THE INVENTION

According to the invention, an apparatus is provided for deployment in an outdoor environment for extending the electrical communication distance of digital data signals. The apparatus includes electrical isolation means for various electromagnetic effects and a high speed pulse reshaper and repeater. The isolation means includes low capacitance electric pulse suppression means so that maximum signal distance can be achieved without loss of usable pulse shape and isolation transformers on differential signal pairs that retain magnetization at elevated temperatures so that signals are not blocked. As a further feature, extended logic is included whereby the type of signals can be distinguished for speed and duplex settings, thus allowing the apparatus to be daisy-chained with like apparatus or used between a termination and a line.

A network interface data rate and half/full duplex mode may differ from that of the network. Different devices are capable of different speeds and some are capable of only one speed. The speed and duplex mode of the lowest common denominator must be extended to the network switch port to avoid communications breakdown.

The invention will be better understood upon reference to the following detailed description in connection with the accompanying drawings.

DETAILED DESCRIPTION OF THE INVENTION

Figure 1:
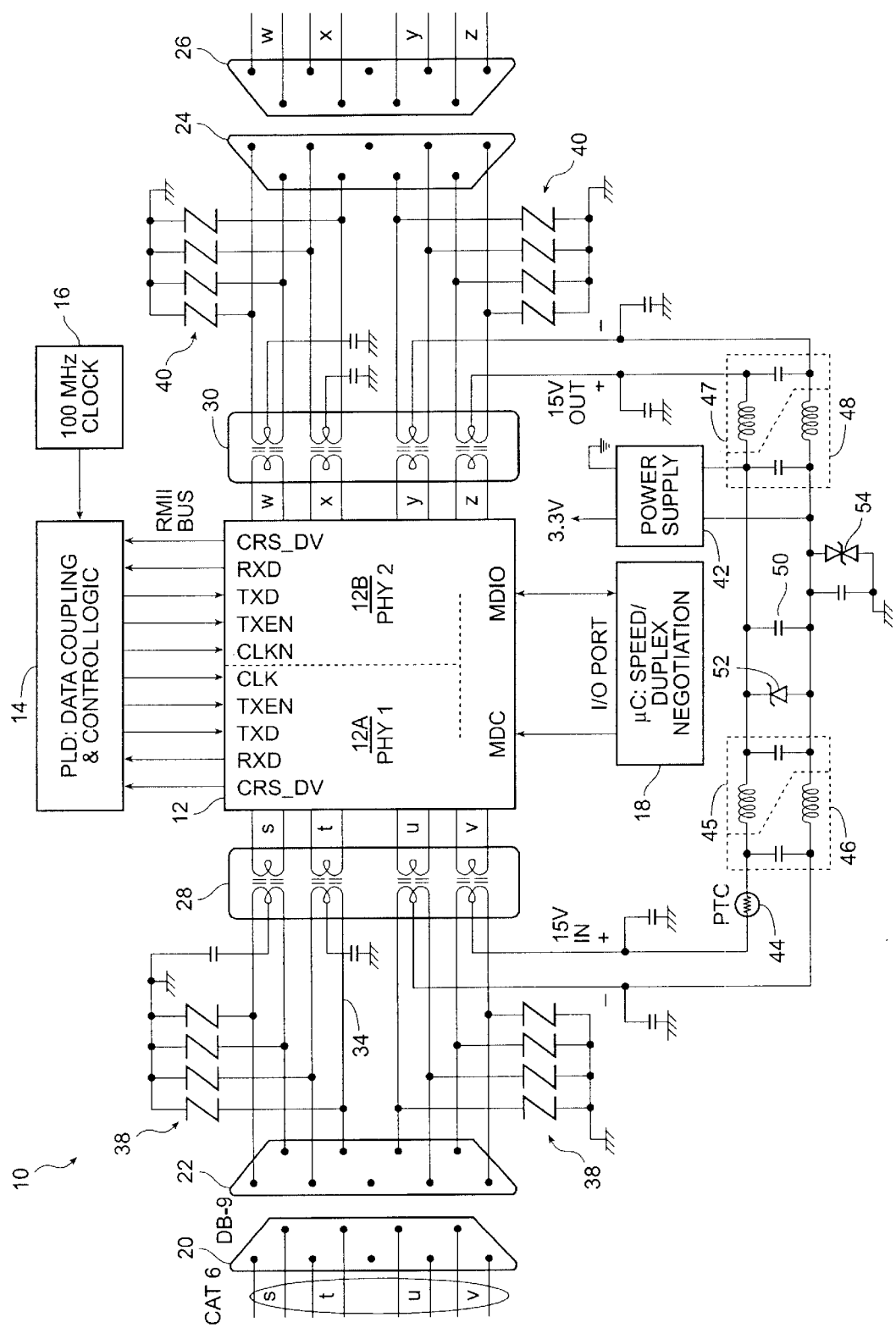
FIG. 1 is a block diagram of an apparatus according to the invention.

FIG. 1 is a block diagram of a line extender 10 according to the invention. The line extender 10 is built around a two port pulse shaping and repeating circuit set (PHY 1) 12A and (PHY 2) 12B for shaping and repeating pulses. This circuit set 12 is an integrated circuit combining sets of low-power physical layer transceiver and protocol control devices.

A specific embodiment for use in a 10/100 MBPS application is a Model AC104QF PHY quad (four element) device manufactured by Broadcom, Inc. of Irvine, Calif. This circuit is compliant with specific standards, namely the IEEE 802.3u specification and the RMII (Reduced Media Independent Interface) specification. The 10/100 MBPS PHY typically uses two unshielded twisted pairs for each transmission port, one pair dedicated to transmit signals (pairs t and w) and a second pair to receive signals (pairs s and x). The other two pairs (u/v and y/z) may be unused for data or they may be used to extend a second 10/100 MBPS line connection and are operated according to the invention for transmission of power. For the three speeds of 10/100 M and 1 Gigabit per second, higher speed PHYs may be used which employ more dedicated channels and wherein each pair of wires is used for both transmit and receive, according to IEEE 802.3ab. In such a case pairs s/t and u/v service one PHY 12A and pairs w/x, y/z service the other PHY 12B. Examples of suitable components are Broadcom Model BCM5402 and Marvel 88E1020 (Sunnyvale, Calif.). The PHY circuit set 12 normally interfaces to a switch or (RS) (Reconciliation Sublayer) of a MAC (media access controller) on one side (not shown) and the hard wired or copper interface on the other side (not shown).

To transmit data, the PHY circuit set 12 converts the digital data stream on the RS side to the appropriate signaling needed to launch the data on the copper cabling. To receive data, the PHY circuit set 12 converts the signals it receives into a digital data stream which is passed up. The RX ports and the TX ports of the PHYs are protected through isolation mechanisms from the outside environment. 10/100 RXD and TXD ports provide interface to internal devices through either an RMII bus or an MII bus (or a RGMII or GMII bus for 1000 BaseT PHY devices).

The line extender 10 employs as a controller for the PHY 12A and 12B a single programmable logic device (PLD) 14 for coupling, timing and logic control. The PLD 14 provides two specific functions. First, it provides the derivation of two 50 MHz clock signals needed in an oscillator section. Second, it provides the control so that two PHYs 12A, 12B can be connected together such that data can be passed between them. A suitable PLD is a Xilinx Coolrunner XCR3032XL-7 VQ441 or an Altera 7032.

A direct connection between two PHYs 12A, 12B cannot be made because the established specification does not provide for access that can be handled easily. In particular, the IEEE 802.3 specification clause 22 describes the interface between the RS and a PHY called the MII (Media Independent Interface) specification. It also describes Station Management which allows access to the registers of each PHY port on the IC. However, the MII specification dictates 16 pins per port, seven for transmitting data and nine for receiving data. For a true four-port PHY, this would be 64 pins merely for interface to the RS. To reduce the pin count and subsequently the cost of the PHY function, a new specification was developed by the RMII Consortium. This subsequent specification is called the RMII Specification. A mapping of MII to RMII has been specified. However, because the functionality of certain pins is combined, it is necessary for the PLD 14 to monitor received signals in order to identify the beginning and end of packets to effect assertion and de-sertion of transmit enable signals at the correct bit times.

A 100 MHz oscillator 16 is coupled to the PLD 14 and used to generate two 50 MHz clocks, CLK (REFCLK) and CLKN (REFCLKN) which are 180 degrees out of phase from each other. These two clocks are both used in the internal logic of the PLD 14. CLK is also used to provide the PHY 12 with a 50 MHz clock. Since both CLK and CLKN are generated from the rising edge of the 100 MHz clock, concerns over the duty cycle of the oscillator and associated jitter, setup and hold times are avoided.

When the line extender 10 is to be deployed in where it must deal with arbitrary types of signals, a mechanism is needed to recognize and respond to assure compatibility between signal sources and signal destination. To this end, a microcontroller 18 is provided which is coupled to the PHY circuit set 12 so it can read the status and set up speed and mode of each PHY element. Its function is primarily to match the speed and duplex setting of the uplink port to the speed and duplex setting of the downlink port. This is done in the 100 BaseT embodiment so that a customer can connect to an Ethernet device that is not 100 MBPS full duplex. The microcontroller 18 used is for example an Atmel AT90LS2343. Nevertheless, a microcontroller is not needed in a line extender used in an environment in which it does not need to autonegotiate speed and mode.

A standard has been adopted for electrical and magnetic isolation of electronic circuitry intended to be operated in a severe outdoor environment. The standard is referenced as IEEE 802.3u, IEEE 802.3ab and ANSI X3.236. The specifications provide for operation in a temperature range between 0 and 70 C. For extended operation between –40 C and +85 C, which is more typical of actual experience in some environments, as well as the extremes of current and of voltage transients, construction of devices merely compliant with this standard is inadequate for reliable operation.

Accordingly, the extender 10 of the invention incorporates a number of features that go beyond standards compliance. Connectors 22, 24 used on the extender 10 are dual (stacked) right angle female DB-9 connectors that mate with DB-9 connectors 20, 26. This type of connector is an industry standard but it is not known to have been used commercially for Ethernet signals. However, its pins provide 360 degree surface area coverage, and mating connectors provide 360 surface coverage for the pin area and are connected through solid mechanical connections and held together with two screws. The signal connectors would normally be expected to be of type RJ-45. However, such connectors are not as robust or as reliable for the intended use as the chosen connectors.

In order to provide the needed electrical isolation, isolation elements 28 and 30 with an extended temperature rating are used for voltage isolation and EMI suppression. The isolation elements 28 and 30 typically provide one isolation transformer per twisted pair or 2–4 isolation transformers per port (as illustrated) in addition to common mode and EMI suppression chokes/filters and line impedance resistors (not illustrated.) Isolation elements 28 and 30 may be incorporated into a single, dual or quad port isolation module Shunted across each of the wiring connections 34 and 36 to ground between the connectors 22 and 24 and the isolation elements are for example SiBar (a brand of Raychem Corporation of Menlo Park, Calif.) (Model TVB170) or SIDACtor (a brand of Teccor of Irving, Tex.) (Model P2604UA) bi-directional overvoltage suppression devices. They suppress voltages above a certain threshold, typically around +/–170 V. This voltage protection is intended to protect the extender 10 from damage or destruction by indirect lightning strikes or other causes such as power line faults. Care must be taken to select low capacitance suppression devices to permit operation of Ethernet signals over cable distances of 150 m.

A high efficiency power supply 42 using a switching regulator is provided to convert power received from upstream (15–22 VDC). The power is filtered and isolated. The power supply provides the voltage needed to power the PHY, namely 3.3 VDC, and to the other active devices. An auto resettable fuse 44 is used to stop current flow when it becomes too high. This provides short circuit protection. When excessive current flows through the fuse, the characteristics of the material change from low impedance to high impedance causing the current flow to cease. The fuse stays in this state until the power is turned off and the fuse has cooled down enough that the material changes back to a low impedance. This permits remote reset of the fuse by momentarily turning off network power. The ambient temperature has an effect on the threshold at which the fuse takes on the high impedance state. The higher the temperature, the lower the amount of current required to cause the fuse to go into a high impedance state.

EMI filters 45–48 are placed in the ground and positive lines of the power source lines from both connectors. The EMI filters 45–48 together with associated shunt capacitors suppress both voltage and current anomalies. In addition, there is both a differential transient voltage filter capacitor 50 built around a single Zener diode or TVS 52 (transient voltage suppressor) placed between the positive voltage and ground return line and a common mode transient voltage protector 54 built around a double Zener diode or bi-directional TVS placed between the ground return line and the chassis ground. In this manner, the extender 10 is effectively isolated from both unwanted common mode and differential transients.

Figure 2:
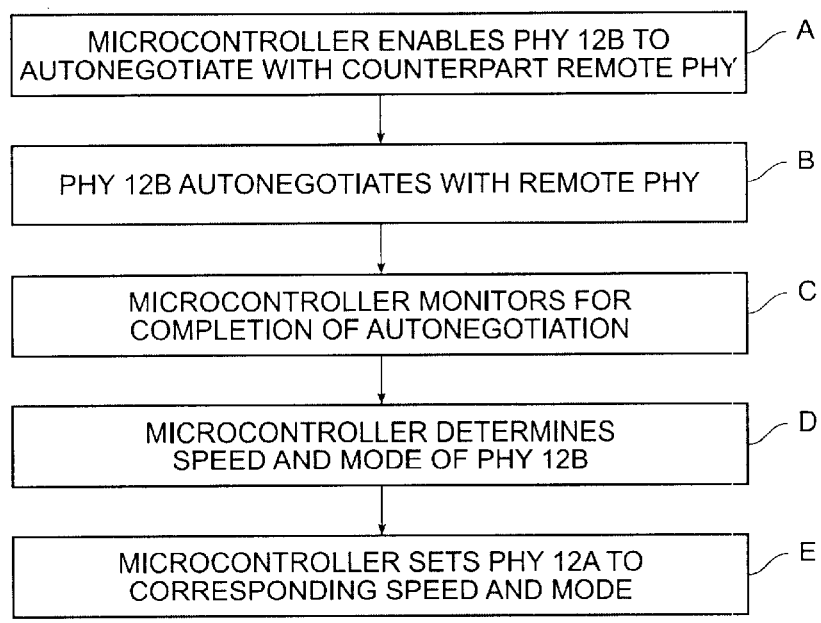
FIG. 2 is a flow chart of operation of a microcontroller according to the invention.

FIG. 2 is a simplified flow chart explaining the operation of the PHY circuit set 12. The PLD 14 talks directly to each PHY 12A, 12B, typically through a Reduced Media Independent Interface (RMII) bus, and it stands alone as a logic device to send two bits (for RMII bus) at a time for an effective 100 MBPS to 1 GBPS data transfer rate. It responds to the speed settings of the PHYs and transfers data between PHYs at the preset speed. The PHYs incorporate RMII to MII translation where the PHYs employ RMII interface. The microcontroller 18 acts as an extended arbitration logic element to enable auto negotiation of data speed and set duplex mode for the addressed PHY. Where the PHY 12B controls the customer downlink port B, the microcontroller 18 enables the PHY 12B to autonegotiation with a neighboring PHY (not shown) at a counterpart port remote from the extender 10 (Step A). The PHY 12B then autonegotiates speed and duplex mode with the neighboring PHY (Step B). The autonegotiation protocol is conventional.

The microcontroller 18 then monitors the status register of PHY 12B to verify that autonegotiation has been completed or has timed out (Step C). The microcontroller 18 then reads status registers of the PHY 12B to determine the speed and mode of the PHY 12B (Step D). Thereupon, the microcontroller 18 writes the matching speed and mode to the control registers of the linking PHY 12A to match the speed and mode of PHY 12A with PHY 12B (Step E). A PHY (not shown) at the remote uplink port off of connector 20 is typically set to its own autonegotiation mode in order to match with the speed and mode of the line extender 10. In this manner the line extender 10 can be daisy chained as it becomes transparent to the downlink port and the uplink port.

Figure 3:
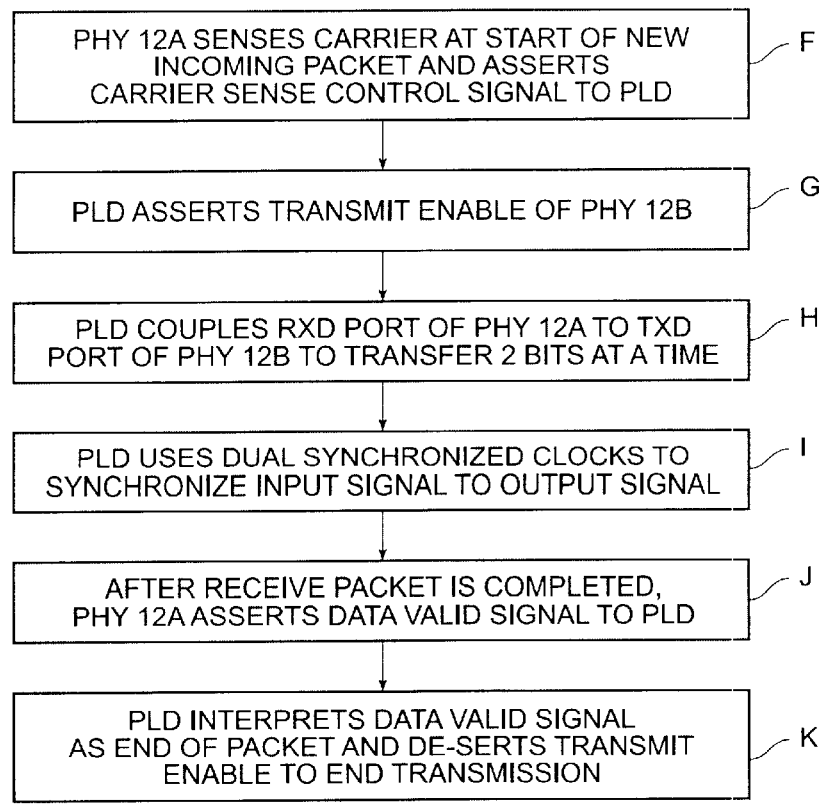
FIG. 3 is a flow chart of operation of a programmed logic element according to the invention.

FIG. 3 illustrates the basic operation of the PLD 14 according to the invention. Two directions of flow control are carried out in duplex: uplink to downlink and downlink to uplink. Only one direction is explained. It will be assumed that the direction is uplink to downlink. PHY 12A acting as a receive PHY senses carrier at the start of a new incoming packet and asserts a Carrier Sense (CRS) control signal to the PLD 18 which identifies it with PHY 12A (Step F). Upon reading the CRS signal, the PLD 14 enables the transmitter of PHY 12B (Step G). Thereupon, the PLD 14 couples the RXD port of PHY 12A to the TXD port of PHY 12B, transferring data two bits at a time (Step H). Not shown is a translation in the PHYs of MII to RMII and RMII to MII.

The PLD 14 employs dual synchronized clocks to synchronize input data and output data (Step I). When the receive packet is completed, PHY 12A drops the assertion of carrier sense (CRS) signal and asserts a data valid (DV) signal to the PLD 14 (Step J). Since the state is known, the DV signal and the CRS signal can share the same pin. The PLD 14 interprets the DV signal and de-serts the Transmit Enable signal of PHY 12B, ending the transmission with the end of the packet (Step K).

The microcontroller makes sure that the signals appear to each other to be homogeneous. The PLD 14 furnishes the control and facilitates the data transfer in real time.

The invention has been explained with reference to specific embodiments. For example, the 100 BaseT RMII PHY has been illustrated because it particularly requires the use of the present invention for implementation. Other embodiments will be evident to those of ordinary skill in the art. It is therefore not intended that this invention be limited, except as indicated by the appended claims.

What is claimed is:

1. An apparatus for extending propagation distance of digital data signals over distance-limited wire media comprising:

a first multiple-pin connector configured to carry first input signals in a first differential pair, to carry first output signals in a second differential pair, and to carry power;

a second multiple-pin connector configured to carry second input signals in a third differential pair, to carry second output signals in a fourth differential pair, and to carry power;

a power line between the first connector and the second connector;

a ground line between the first connector and the second connector;

electromagnetic chokes adjacent ingress locations in the power line;

electromagnetic chokes adjacent ingress locations in the ground line;

transient voltage protection means between the power line and the ground line operative to filter both common mode transient voltage and differential transient voltage in order to isolate said apparatus from unwanted transients;

a low-capacitance electric pulse suppression means operative to suppress both voltages and current anomalies in order to achieve maximum distance of signal in usable pulse shape, between each element of said first, second, third and fourth differential pairs and ground adjacent each said first and second connector;

a first pulse shaping and repeating circuit for shaping and repeating pulses of said input signals received and for transmitting said output signals;

a second pulse shaping and repeating circuit for shaping and repeating pulses of said input signals received and for transmitting said output signals;

first isolation transformers coupled between said first connector and said first pulse shaping circuit for common mode transient and voltage isolation and for electromagnetic interference filtering of said first differential pair and said second differential pair from said pulse shaping circuit, said isolation transformers being capable of maintaining magnetizing inductance at elevated temperatures;

second isolation transformers coupled between said second connector and said second pulse shaping circuit for common mode transient and voltage isolation and for electromagnetic interference filtering of said third differential pair and said fourth differential pair from said pulse shaping circuit, said isolation transformers being capable of maintaining magnetizing inductance at elevated temperatures;

a programmed logic device coupled to said first and second pulse shaping circuits for coupling input signals originating from the first connector directed to the second connector and for coupling input signals originating from the second connector directed to the first connector; and a microcontroller coupled to said pulse shaping and repeating circuit for distinguishing and controlling between types of input signals and output signals, and for managing control signals for compatibility.

2. The apparatus according to claim 1 wherein said microcontroller comprises means operative to distinguish between full duplex and half duplex as well as to sense speed.

3. The apparatus according to claim 1 wherein said pulse shaping and repeating circuits are coupled to said programmed logic element through a reduced media independent interface bus.

4. The apparatus according to claim 1 wherein said pulse shaping and repeating circuits are each a low-power physical layer transceiver and protocol control device.

5. An apparatus for bidirectional distribution of packet-switched digital data signals over distance-limited wire media in an outdoor environment comprising:

a first multiple-pin connector configured to carry first input signals in a first differential pair and in a fifth differential pair, to carry first output signals in a second differential pair and in a sixth differential pair, and to carry power;

a second multiple-pin connector configured to carry second input signals in a third differential pair and in a seventh differential pair, to carry second output signals in a fourth differential pair and in an eighth differential pair, and to carry power;

a power line;

a ground line;

electromagnetic chokes adjacent ingress locations in the power line;

electromagnetic chokes adjacent ingress locations in the ground line;

transient voltage protection means between the power line and the ground line operative to filter both common mode transient voltage and differential transient voltage in order to isolate said apparatus from unwanted transients;

a low-capacitance electric pulse suppression means operative to suppress both voltages and current anomalies in order to achieve maximum distance of signal in usable pulse shape, between each element of said first, second, third and fourth differential pairs and ground adjacent each said first and second connector;

a first pulse shaping and repeating circuit for shaping and repeating pulses of said input signals received and for transmitting said output signals;

a second pulse shaping and repeating circuit for shaping and repeating pulses of said input signals received and for transmitting said output signals;

first isolation transformers coupled between said first connector and said first pulse shaping circuit for common mode transient and voltage isolation and for electromagnetic interference filtering of said differential pairs from said first pulse shaping circuit, said isolation transformers being capable of maintaining magnetizing inductance at elevated temperatures;

second isolation transformers coupled between said second connector and said second pulse shaping circuit for common mode transient and voltage isolation and for electromagnetic interference filtering of said differential pairs from said second pulse shaping circuit, said isolation transformers being capable of maintaining magnetizing inductance at elevated temperatures;

a programmed logic device coupled to said first and second pulse shaping circuits for coupling input signals originating from the first connector directed to the second connector and for coupling input signals originating from the second connector directed to the first connector; and a microcontroller coupled to said pulse shaping and repeating circuit for distinguishing and controlling between types of input signals and output signals, and for managing control signals for compatibility.

* * * * *